(12) United States Patent
Tamm et al.

(10) Patent No.: US 7,219,399 B2
(45) Date of Patent: May 22, 2007

(54) TRIGGER ACTUATED CABLE CLAMP

(75) Inventors: Carl R. Tamm, Trussville, AL (US); Robert G. Hay, Pelham, AL (US); Stanley R. Siegrist, Leeds, AL (US)

(73) Assignee: Hubbell Incorporated, Orange, CT (US)

( * ) Notice: Subject to any disclaimer, the term of this patent is extended or adjusted under 35 U.S.C. 154(b) by 41 days.

(21) Appl. No.: 11/239,639

(22) Filed: Sep. 30, 2005

(65) Prior Publication Data
US 2007/0074378 A1    Apr. 5, 2007

(51) Int. Cl.
*F16G 11/00*    (2006.01)
*F16G 11/04*    (2006.01)

(52) U.S. Cl. ............ 24/136 R; 24/136 L; 24/132 WL; 24/115 M; 294/102.1; 403/314; 403/374.1; 439/820

(58) Field of Classification Search .......... 24/132 WL, 24/136 L, 115 M, 136 R; 403/314, 374.1, 403/369; 439/820, 821; 294/102.1
See application file for complete search history.

(56) References Cited

U.S. PATENT DOCUMENTS

| | | | |
|---|---|---|---|
| 2,138,913 A | 12/1938 | Fotsch | |
| 2,554,387 A | 5/1951 | Saul | |
| 2,567,374 A | 9/1951 | Greco | |
| 3,072,989 A * | 1/1963 | Jugle et al. ................. 403/369 |
| 3,205,300 A | 9/1965 | Becker | |
| 3,852,850 A | 12/1974 | Filhaber | |
| 3,910,546 A * | 10/1975 | Connors ................... 24/136 R |
| 3,965,542 A * | 6/1976 | Gregory ................... 24/136 R |
| 4,362,352 A | 12/1982 | Hawkins et al. | |
| D278,230 S | 4/1985 | Kominiak et al. | |
| 4,698,031 A | 10/1987 | Dawson | |
| 5,015,023 A * | 5/1991 | Hall ........................ 294/102.1 |
| 5,334,056 A | 8/1994 | Hlinsky | |
| 5,369,849 A * | 12/1994 | De France ................ 24/136 R |
| 5,539,961 A * | 7/1996 | DeFrance ................. 24/136 R |
| 5,683,273 A | 11/1997 | Garver et al. | |
| 6,206,736 B1 | 3/2001 | DeFrance et al. | |
| 6,817,909 B2 | 11/2004 | Dobrinski et al. | |

\* cited by examiner

*Primary Examiner*—Robert J. Sandy
(74) *Attorney, Agent, or Firm*—Jenae C. Avallone; Mark S. Bicks; Alfred N. Goodman

(57) ABSTRACT

A clamp for a cable having a housing with a first end, a second end, and an interior cavity to receive the cable. The clamp also includes a jaw assembly having a notch. The jaw assembly moves between locked and triggered positions within the cavity. A biasing member is disposed within the cavity to bias the jaw assembly towards the triggered position. A retainer is arranged within the cavity and has gripping fingers to engage the notches in the locked position. A trigger is positioned within the cavity. The trigger has an outer locking portion to engage with the gripping fingers to releasably secure the gripping fingers in the notches to retain the jaw assembly in the locked position. When the cable is inserted into the interior cavity and contacts the trigger device, the gripping fingers and notches disengage so that the biasing member biases the jaw assembly towards the first end of the clamp to clamp the cable.

20 Claims, 8 Drawing Sheets

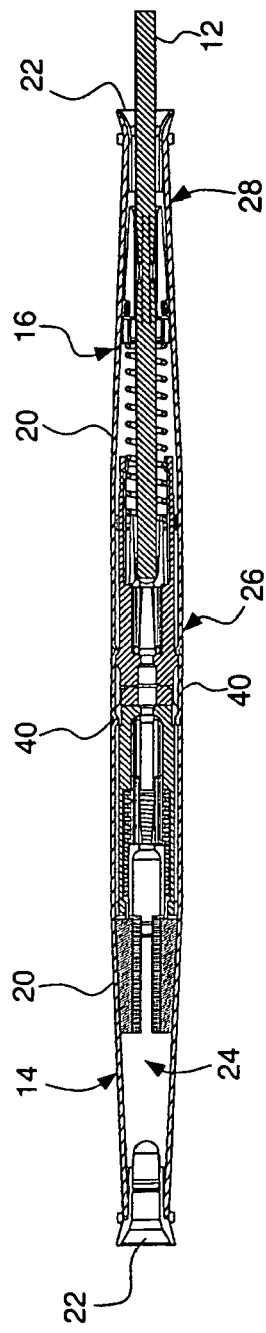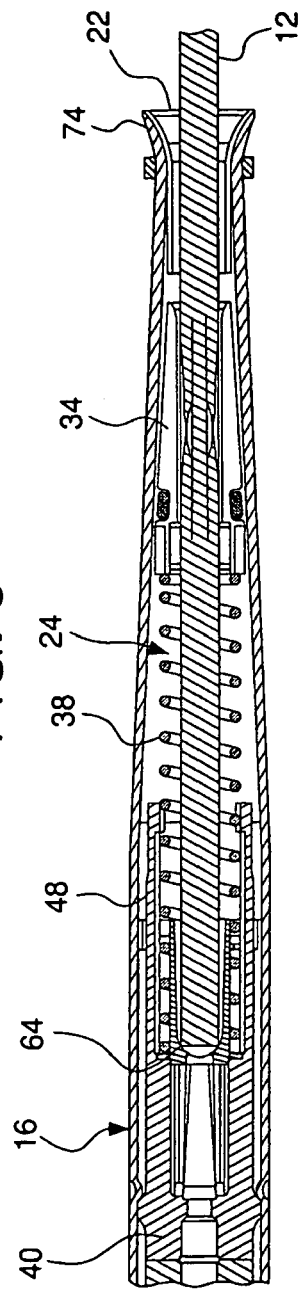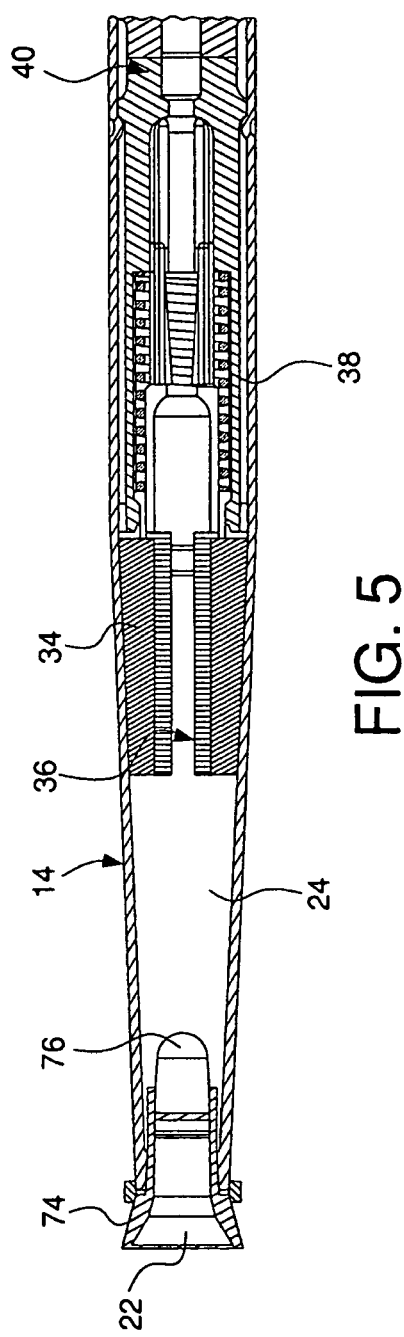

TRIGGER ACTUATED CABLE CLAMP

FIELD OF THE INVENTION

The present invention relates to a cable clamp. More particularly, the present invention relates to a trigger actuated cable clamp which is activated by contact from the end of a cable to initiate the release of a jaw assembly.

BACKGROUND OF THE INVENTION

One type of cable connector is the automatic splice. The automatic splice is commonly used by utility linemen to quickly splice ends of suspended cable together. Automatic splices generally include a tapered clamp body or shell to house a pair of jaw assemblies and a spring. The jaws are shaped to cooperate with the clamp body so that a cable gripping surface applies an ever increasing clamping force on the cable as it travels through the clamp body towards a cable receiving opening.

U.S. Pat. No. 5,334,056 to Hlinsky, discloses a relatively complex automatic cable connector configured for electrical and mechanical or only mechanical connections. The device includes a hammer 16 that is moved to a cocked position by the end of an inserted cable 20. A hammer spring 18 is compressed during the cocking motion. When the cocked position is reached, a frangible abutment 64 fractures and the hammer 18 is free to move independently of the cable. The spring 18 drives the hammer 16 into tapered gripping jaws 38 with an impact that firmly grips the jaws onto the cable 20. Since the installer must forcibly compress the spring 18, the stored energy of the spring 18 is comparatively weak, and is limited by the installer's strength and the column strength of the cable being inserted. Therefore, the jaws 38 are often prevented from developing full engagement with the cable 20. Also, the cable 20 tends to pull out of the jaws 38. This pull out may occur during the installation procedure, requiring the automatic cable connector to be discarded.

If the device is double-ended and utilized for a splicing operation, if one end of the connector is unsuccessfully installed, the connector must be cut off. The connector cannot be disassembled. This situation leaves the installer with too short a length of cable. Two additional connectors are then required, one to replace the failed connector, and the other to splice in an additional length of cable to replace the portion that was cut out with the original unsuccessful splice. Furthermore, the connector may hold sufficiently to allow installation to proceed, but, without full insertion. In this event, the line may be energized, but, there is still a propensity for the splice to fail under wind, vibration, ice, or other additional loading that may occur during future use.

U.S. Pat. No. 2,554,387 to Saul discloses another cable connector. In this connector, a wire 30 is inserted into the tapered end of a housing 7. The wire 30 pushes a set of jaws 10 backward. The jaws 10 expand to permit passage of wire 30. As shown in FIG. 2, the wire end, after passing through the jaws 10, enters trigger element 20. Continued insertion of the wire 30 causes the wire end to engage the conical surface defined by the inclined sleeve portions of the trigger element 20. Thus, the inclined sleeve portions expand in a radial direction so that hooks 23 disengage from the flange 17. This disengagement releases trigger element 20. Consequently, spring 26 biases the trigger element 20 into engagement with jaws 10. The spring 26 further functions to urge the jaws 10 into the tapered end of the housing to effect initial gripping between the jaws 10 and the wire 30. One drawback of this device is that it is relatively susceptible to premature triggering or firing. In a splicing operation, premature triggering could occur on one end of the device, leaving the other end operational. Since this condition would not be readily apparent to the installer, the unit might accidentally be installed on the non-triggered end, if one exists, only to find the other end triggered. Therefore, removal of the automatic splice is necessary as previously described.

Accordingly, in order to address these disadvantages, there have been various additional attempts to provide improved cable clamps. Examples of such are disclosed in U.S. Pat. No. 6,817,909 to Dobrinski et al.; U.S. Pat. No. 6,206,736 to DeFrance et al.; U.S. Pat. No. 6,193,565 to Herron; U.S. Pat. No. 5,683,273 to Garver et al.; U.S. Pat. No. 5,278,353 to Buchholz et al.; 4,698,031 to Dawson; U.S. Pat. No. 4,362,352 to Hawkins et al.; U.S. Pat. No. 3,852,850 to Filhaber; U.S. Pat. No. 3,205,300 to Becker; U.S. Pat. No. 2,567,374 to Greco; U.S. Pat. No. 2,554,387 to Saul; U.S. Pat. No. 2,138,913 to Fotsch; Des. 278,230 to Kominiak et al. Although some of the features of those cable clamps ease the disadvantages described above, a continuing need exists for an improved trigger actuated cable clamp which is relatively simple to manufacture, limits pre-triggering of the device, and prevents mechanical failure.

SUMMARY OF THE INVENTION

An object of the present invention is to provide a cable clamp which prevents the premature release of stored energy prior to insertion of the cable.

Another object of the present invention is to provide a cable clamp which enables an installer to relatively easily ascertain full insertion of the cable so that mechanical failure due to improper installation is prevented.

A further object of the present invention is to provide a cable clamp that is relatively simple to assemble, use, manufacture, and package.

The foregoing objects are basically attained by providing a clamp for a cable with a housing having a first end, a second end, and an interior cavity to receive the cable. At least two jaws are disposed within the cavity. Each jaw has a notch. The jaws move between locked and triggered positions within the cavity. A biasing member is disposed within the cavity to bias the jaws towards the triggered position. A retainer is arranged within the cavity and has at least two gripping fingers to engage the notches in the locked position. A trigger is positioned within the cavity. The trigger has an outer locking portion to engage with the at least two gripping fingers to releasably secure the at least two gripping fingers in the notches to retain the jaws in the locked position. When the cable is inserted into the cavity and makes contacts with the trigger device, the gripping fingers and notches disengage. Then, the biasing member biases the jaws towards the first end of the housing to clamp the cable.

The foregoing objects are also attained by providing a clamp having a housing with a first end, a second end, and an interior cavity. At least two jaws are disposed within the cavity. Each jaw has a notch with a biasing member located within the cavity to bias the jaws towards the first end. A retainer is also located within the cavity and includes at least two gripping fingers. Each gripping finger has an inner surface with a boss to engage with the notches. A trigger is also located within the cavity. The trigger has an outer locking portion to engage an outer surface of each gripping finger. The trigger also has a receiving section.

The foregoing objects are further attained by providing a device for splicing cables. The device includes a body with opposing ends and a clamp located at each end. Each clamp has a housing with a first end, a second end, and an interior cavity. At least two jaws are disposed within the cavity. Each jaw has a notch. A biasing member is also disposed within the cavity to bias the jaws towards the first end. A retainer within the cavity includes at least two gripping fingers. Each gripping finger has an inner surface with a boss configured to engage the notches. A trigger is also disposed within the cavity and has a locking portion to engage an outer surface of each gripping finger. The trigger also has a receiving section. A guide cup is located within the cavity and moves with the cable to contact the receiving section.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

For a more complete understanding of the invention and advantages of certain embodiments thereof, reference is now made to the following description taken in conjunction with the accompanying drawings, which form a part of this application and in which:

FIG. 3 is a side elevational view in section of the splicing connector FIG. 1, showing one pair of jaws in the triggered position clamping a cable and another pair of jaws in the locked position prior to insertion of another cable;

FIG. 4 is an enlarged side elevational view in section of the right cable clamp of FIG. 3 in the triggered position;

FIG. 5 is an enlarged side elevational view in section of the left cable clamp of FIG. 3 in the locked position;

DETAILED DESCRIPTION OF EXEMPLARY EMBODIMENTS

Figure 1:
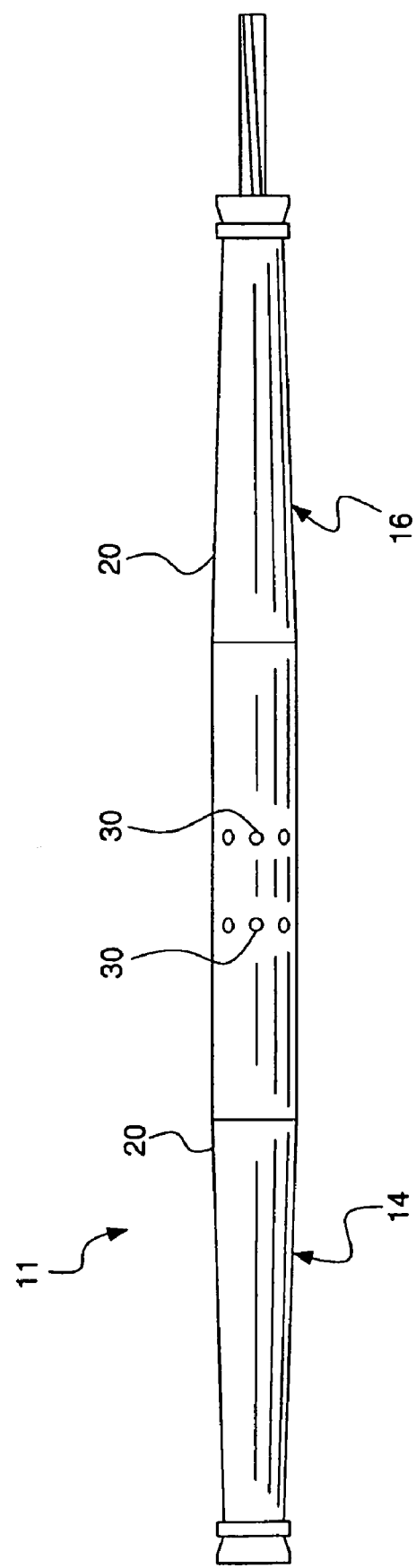
FIG. 1 is a side elevational view of a splicing connector with two cable clamps in accordance with an embodiment of the present invention.
Figure 2:
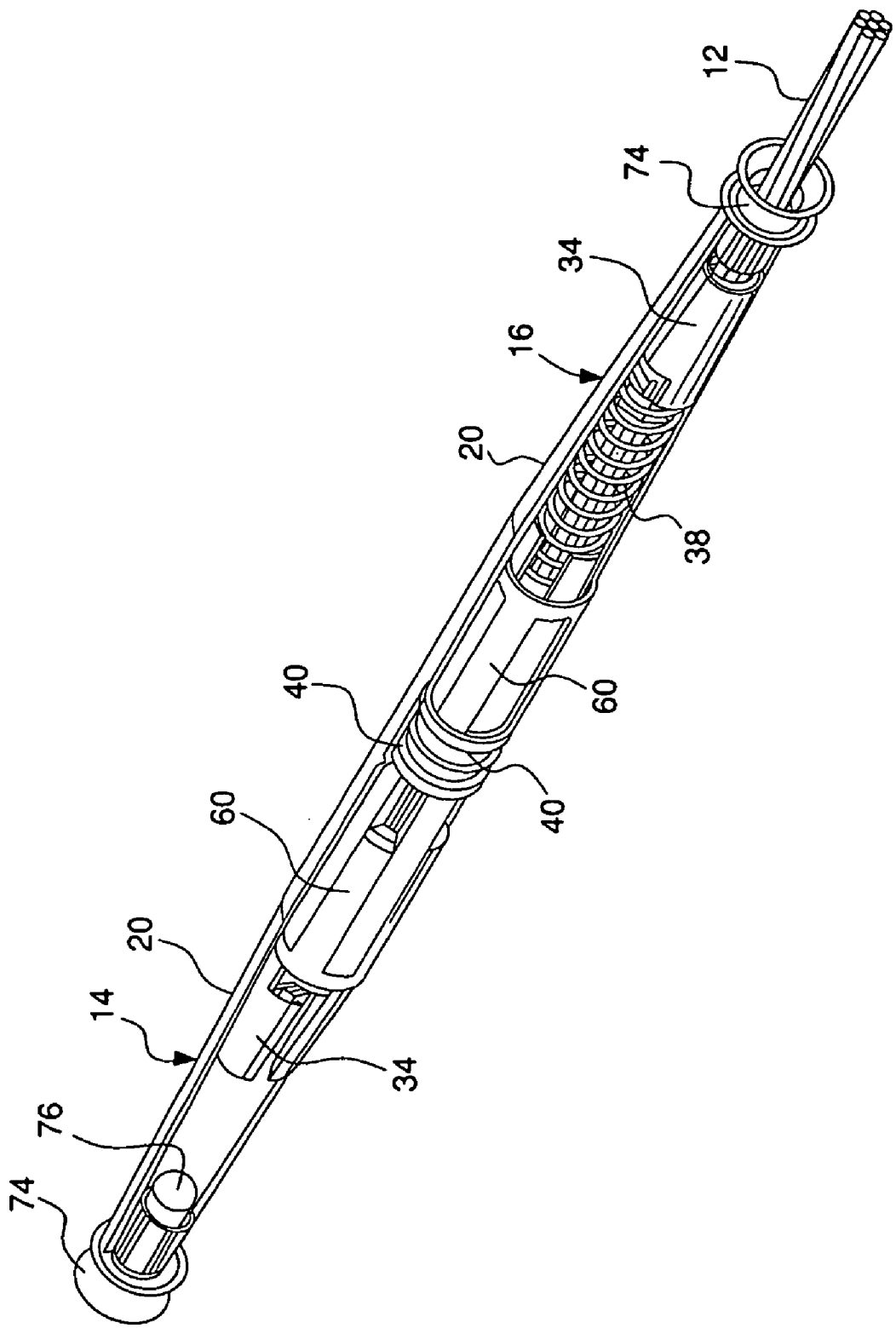
FIG. 2 is a perspective view in partial section of the splicing connector of FIG. 1.
Figure 6:
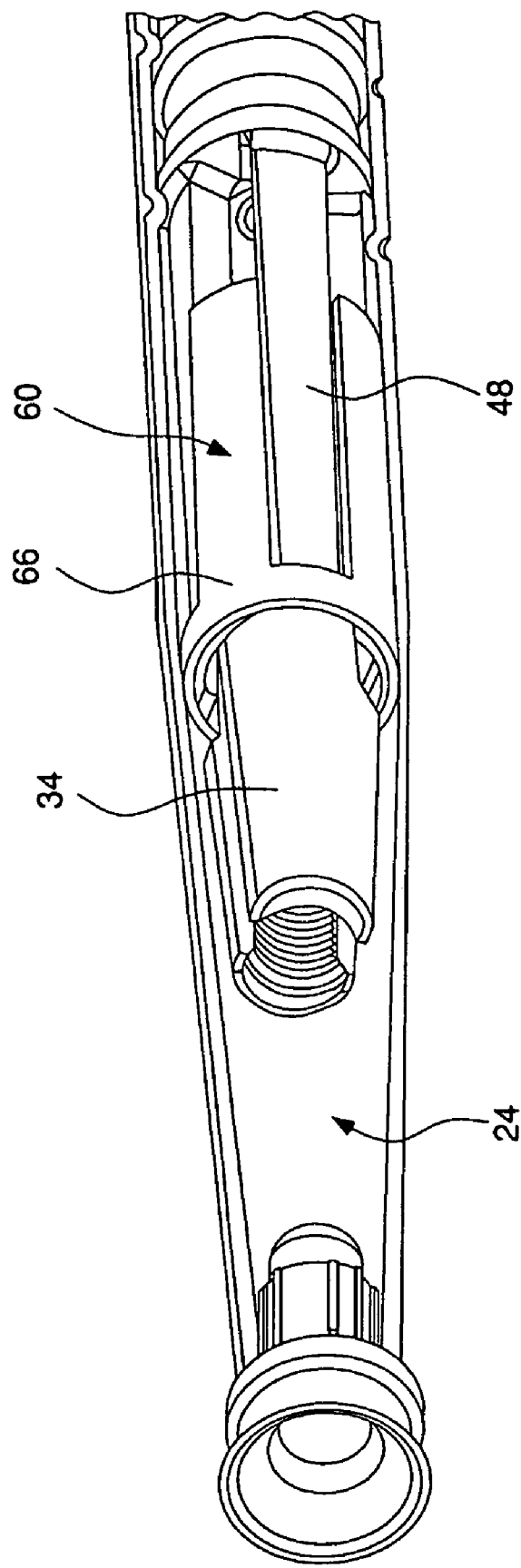
FIG. 6 is an perspective view of the cable clamp of FIG. 5 in partial section in the locked position.

FIGS. 1–10 illustrate a splicing connector 11 for a cable 12 having first and second cable clamps 14 and 16, each cable clamp 14 and 16 being a mirror image of the other. In the exemplary embodiment, the cable clamps 14 and 16 are used to make an electrical and a mechanical connection (e.g. splicing); however, a single clamp assembly may be used to establish a mechanical connection. As best seen in FIG. 2, each clamp 14 and 16 includes a housing 20, a jaw assembly 34, a biasing member 38, a trigger 60, a retainer 40, a guide cup 76, and a funnel guide 74. In FIG. 2, the jaw assembly 34 of cable clamp 14 is in the locked position and the jaw assembly of cable clamp 16 is in the triggered position.

Figure 7A:
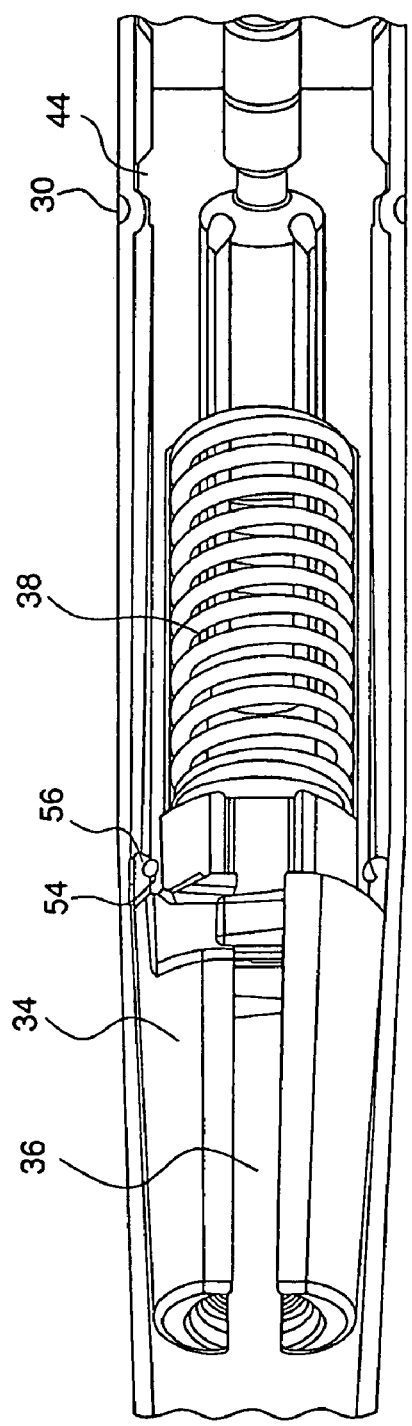
FIGS. 7a and 7b are enlarged perspective views in partial section of the cable clamp of FIG. 5 in the locked position.
Figure 7B:
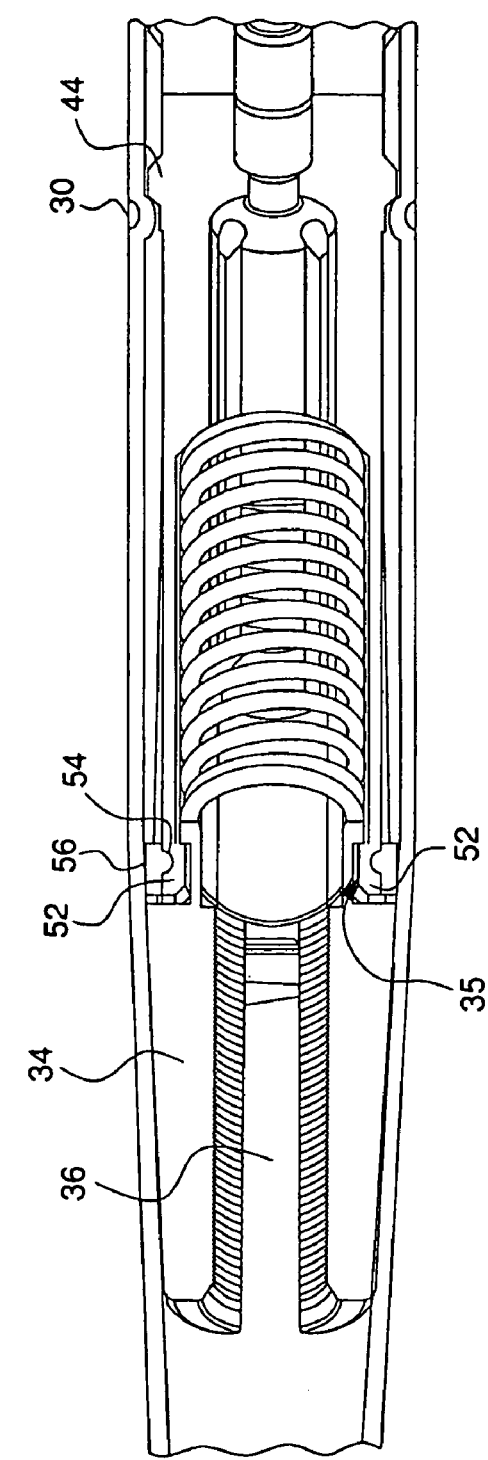

In FIGS. 3–5, each housing 20 is substantially conically shaped, tapers in an opposite direction, and has a receiving opening 22. Each housing 20 may be fabricated of a suitable material such as steel or aluminum. An interior cavity 24 (FIG. 3) extends between first and second ends 26 and 28 in each housing. Interior cavity 24 tapers from the first end to the second end 26 and 28 to cooperate with jaw assembly 34. Each receiving opening 22 is located on the second end 28 of the cable clamps 14 and 16 so that a cable 12 may be inserted into a respective cavity 24. As best seen in FIGS. 1, 7a and 7b, dimples or deformations 30 may be formed near the first end 26 of each housing 20 to facilitate centering of each retainer 40. Centering is accomplished by mating the dimples 30 within a respective annular boss 44 (FIGS. 7a and 7b) located on the retainer 40.

As stated above, each jaw assembly 34 moves between locked and triggered positions (FIGS. 2, 5–7 and FIGS. 2, 4 and 8, respectively). In the exemplary embodiment, each jaw assembly 34 has two jaws; however, other suitable arrangements maybe used. Each jaw assembly 34 is preferably made of a suitable material such as steel or aluminum and is axially aligned within a respective interior cavity 24.

Figure 8:
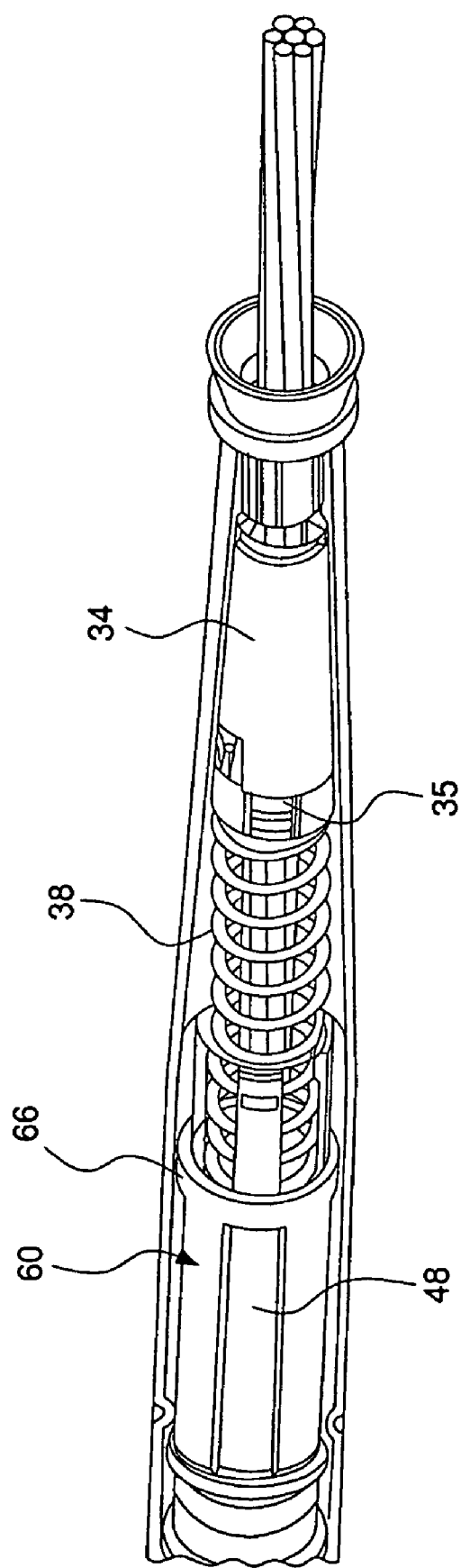
FIG. 8 is an enlarged perspective view in partial section of one of the cable clamps of FIGS. 1–5 in the triggered position.

Turning to FIGS. 5, 7b and 8, each jaw includes a notch 35 on an outer surface thereof for engagement with a boss 52 of a respective gripping finger 48; as will be described in more detail below. Each jaw is arcuate and has an outer surface tapering from one end to the opposite end. The tapered outer surface cooperates with the tapered interior cavity 24 of each housing 20 to produce the gripping effect of the cable clamps 14 and 16. The jaws of each jaw assembly 34 are shaped so as to define a generally cylindrically shaped cable insertion passageway 36 to receive a cable 12 therethrough in the locked position.

Each biasing member 38 moves a respective jaw assembly 34 to the triggered position (FIGS. 2, 4 and 8). The jaws are moved toward one another as they travel from the first end 26 of each housing 20 to the second end 28. The movement of the jaws toward one another is facilitated by the mating tapered shapes of the interior cavity 24 and the outer surfaces of the jaws. As the jaws travel towards each receiving opening 22, the clamping forces acting upon each cable 12 increase.

Each biasing member 38 is preferably made of a suitable material such as a steel or aluminum compression spring; however, each biasing member 38 may be replaced with an explosive shell such as a .22 caliber load fire-on. Each biasing member 38 is also located within the interior cavity 24 of a respective housing 20. Each biasing member 38 is normally compressed in the locked position (FIG. 5) between the jaws and retainer 40. In the locked position, biasing member 38 has its maximum potential energy in the assembly. For example, when trigger 60 of clamp 14 is actuated, biasing member 38 is released to bias the jaws toward the triggered position (FIG. 4).

Annularly shaped retainer 40 is also located within each interior cavity 24. Turning to FIG. 10, each retainer 40 has first and second ends. Each retainer 40 is preferably made of a suitable resilient material such as thermoplastic. The first end includes the stop member 42. The stop member 42 has a mating member such as a pin 43a and socket 43b arranged on a surface thereof to mate with an opposing retainer. The pin/socket 43a, 43b interference fit secures each retainer 40 within the housing 20. The pin/socket 43a/43b assembly is merely exemplary, and other suitable mating members such as clips, notches, or latches can also be used. The dimples 30 couple with the simple annular boss 44 (FIGS. 7a and 7b) to provide anchorage to each opposing retainer 40, respectively. The dimples 30 also prevent movement towards the second end 28.

Figure 10A:
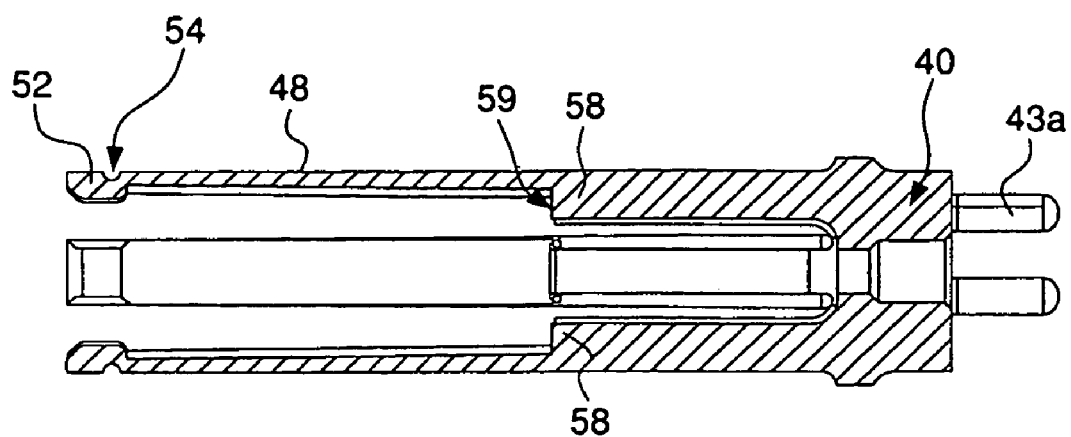
FIGS. 10a and 10b are side elevational views in section of the retainer shown in FIGS. 2–7.
Figure 10B:
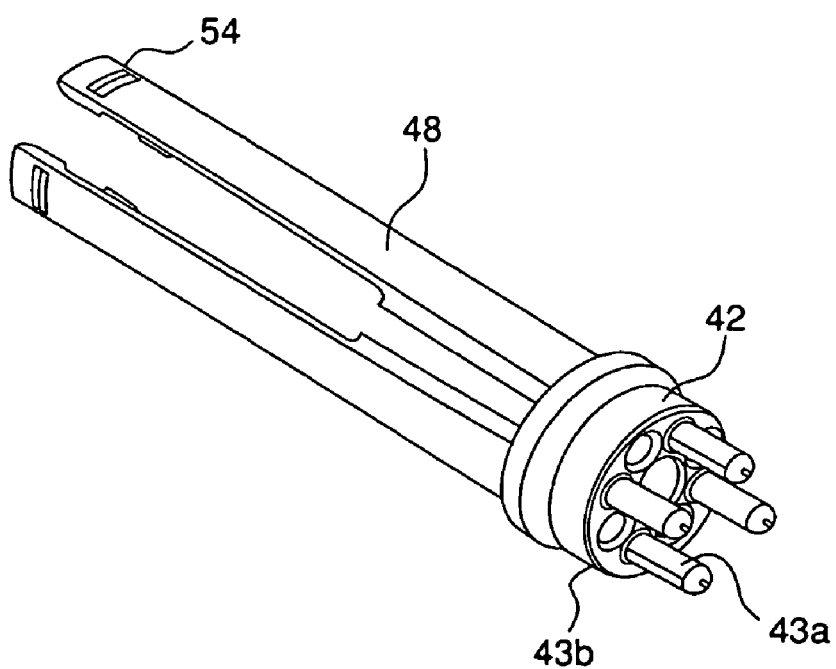

As seen in FIGS. 10a and 10b, each retainer 40 has gripping fingers 48. In the exemplary embodiment four uniformly spaced gripping fingers 48 are shown; however, other suitable arrangements and constructions may be used. The gripping fingers 48 extend in the axial direction of each respective housing 20. The gripping fingers 48 have inner and outer surfaces. The outer surfaces define a first annular periphery. In the exemplary embodiment, the gripping fingers 48 have bosses 52 disposed on the inner surface thereof proximate to the second end of the retainer 40. Also, in the exemplary embodiment, the gripping fingers 48 have recesses 54 located on their outer surface to receive inwardly directed protrusions 56 arranged on each trigger 60 (FIGS. 7a and 7b); however, it should be understood that other suitable arrangements and constructions maybe used. For example, the gripping fingers 48 maybe provided with outwardly directed protrusions, and the trigger 60 maybe provided with recesses.

The gripping fingers 48 preferably have a substantially J-shaped biasing member supports 58 which extend from the inner surface closer to the first end of the retainer 40. The biasing member supports 58 collectively form a biasing member nesting section 59 to secure the biasing member 38 in place within the retainer 40.

Figure 9A:
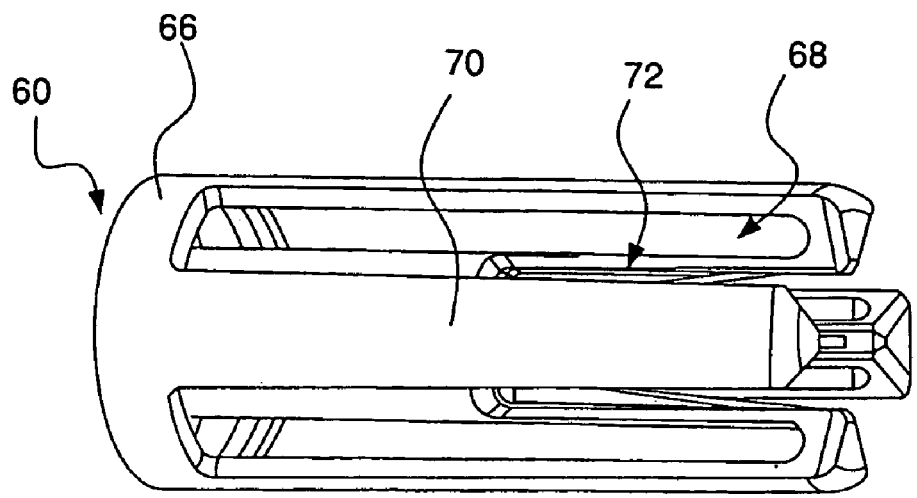
FIGS. 9a and 9b are a rear left side perspective view and a front left side perspective views, respectively, of the trigger of FIGS. 2–7.
Figure 9B:
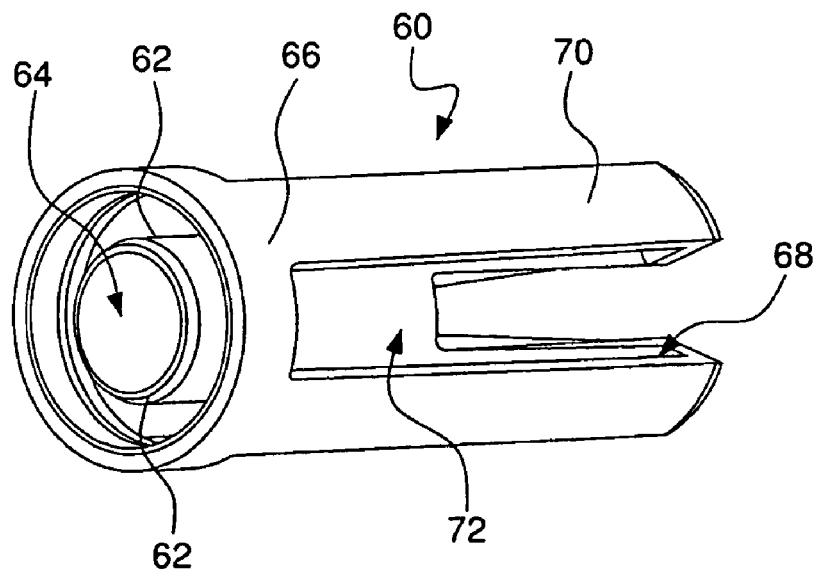

FIGS. 9a and 9b illustrate the trigger 60 used in cable clamps 14 and 16. Each trigger 60 is also preferably annularly shaped and is made from a suitable material such as thermoplastic. Since both triggers are identical, only one will be described in detail. Trigger 60 has the inner ring 62 which defines a closed end cable receiving section 64 to receive the cable 12. The cable receiving section 64 is substantially U-shaped in longitudinal section and circular in transverse section. The trigger 60 also has the annular outer locking portion 66. As best seen in FIGS. 7a and 7b, the outer locking portion 66 has diametrically opposed protrusions 56 formed on an inner surface thereof to engage the recesses 54 of the gripping fingers 48. As stated above, FIGS. 7a and 7b are merely exemplary, and alternatively the gripping fingers 48 maybe provided with outwardly directed protrusions, and the trigger 60 maybe provided with recesses. The interference fit between the two components prevents premature firing of the trigger 60, since a substantial mechanical force would be necessary to overcome the interference fit.

Turning back to FIGS. 9A and 9b, the inner ring 62 and the outer locking portion 66 define a guide sleeve 68. Four guide supports 70 extend from the inner ring 62 and outer locking portion 66 to define the guide sleeve 68 periphery. In between adjacent guide supports 70 are spaces 72 to receive the gripping fingers 48. Thus, the guide sleeve 68 provides a space in between inner ring 62 and outer locking portion 66. This space is provided to receive the biasing member 38. The inner ring 62 operates within the biasing member 38.

As best seen in FIGS. 2, 4, and 5, funnel guides 74 may be fitted within each receiving opening 22 to facilitate insertion of cable 12. Additionally, since the majority of cables are multi-stranded, a guide cup 76 may also be provided. An end of the guide cup 76 is generally arcuate. The guide cup 76 serves to prevent the individual strands from splaying out from each cable 12 and tangling up within each jaw assembly 34 to prevent proper closure. The funnel guide 74 and guide cup 76 may have axial slots disposed thereon for facilitating expansion and compression. Upon insertion of a cable 12, the cable 12 extends through the funnel guide 74. An end of the cable 12 engages the guide cup 76. The cable 12 moves the guide cup 76 until the guide cup 76 contacts the cable receiving section 64 of the trigger 60.

ASSEMBLY AND OPERATION

Each cable clamp is assembled by first inserting triggers 60 to a full depth within each respective side of retainer 40, followed by biasing members 38 in their respective nesting sections 59, and setting jaw assembly 34 by compressing biasing members 38 until bosses 52 align with notches 35, respectively, as seen in FIG. 7b. Each trigger 60 is then slid in the opposite direction, where the outer locking portion 66 with inwardly directed protrusions 56 positioned over the bosses 52 and into recesses 54 such that the extreme end the outer locking portion 66 is aligned with the ends of gripping fingers 48, and inner ring 62 is nested within each respective jaw assembly 34.

Each clamp 14 and 16 is disposed within each housing 20 prior to swaging the ends, and can be centered and fixed therein by the pin/socket 44a/44b interference fit of the stop members 42. Additionally, dimples 30 are rolled into the housing 20. As stated above, the dimples may interact with the simple annular boss 44 to provide anchorage for each opposing retainer 40, respectively, and prevent movement towards the second end 28. Next, funnel 74 and guide cups 76 are inserted into the respective ends of the housing 20.

Cable clamps 14 and 16 are now ready to receive a cable 12 into their respective receiving openings 22. For purposes of clarity and conciseness, the insertion of only one cable 12 into cable clamp 16 will be described. First, cable 12 is inserted into receiving opening 22 to contact the guide cup 76. The guide cup 76 is retained on the end of the cable 12. The guide cup 76 and the cable 12 pass entirely through jaw assembly 34, which is in the locked position (FIGS. 7a and 7b), to contact the cable receiving section 64 of the trigger 60. Further advance of the cable 12 forces the trigger 60 backwards toward the first end 26 of the housing 20. The protrusions 56 of the outer locking portion 66 are thereby released from the recesses 54 of the gripping fingers 48. Consequently, as the outer locking portion 66 clears the ends of the gripping fingers 48, the gripping fingers 48 deflect outwardly via the force provided by the biasing member 38. Thus, releasing the bosses 52 from the notches 35 of the jaw assembly 34. The biasing member 38 then forces the jaw assembly 34 into the tapered section of the interior cavity 24 (FIG. 8). With cooperation of the tapered interior cavity 24, each jaw of the jaw assembly 34 is forced radially inward and into intimate contact with the cable 12 as the assembly advances towards the receiving opening 22. Thus, the cable 12 is firmly secured within interior cavity 24.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A clamp for a cable, comprising:
   a housing with a first end, a second end, and an interior cavity to receive the cable;
   at least two jaws each having a notch, the at least two jaws being movable between locked and triggered positions within the cavity;

a biasing member within the cavity biasing the at least two jaws towards the triggered position;

a retainer within the cavity having at least two gripping fingers engaging the notches in the locked position; and a trigger within the cavity having a outer locking portion engaged with the at least two gripping fingers to releasably secure the at least two gripping fingers in the notches to retain the at least two jaws in the locked position;

wherein when the cable is inserted into the interior cavity and contacts the trigger device, the at least two gripping fingers and notches disengage and the biasing member biases the at least two jaws towards the first end of the housing to clamp the cable.

2. A clamp according to claim 1, further comprises
a funnel guide is disposed on the second end.

3. A clamp according to claim 2, further comprises
a guide cup is disposed in the interior cavity proximate the second end.

4. A clamp according to claim 1, wherein
the housing is substantially conically shaped.

5. A clamp according to claim 1, wherein
the interior cavity has a surface that tapers outwardly from the first end to the second end of the housing.

6. A clamp according to claim 1, wherein
the retainer has a substantially annular biasing member nesting section to receive an end of the biasing member.

7. A clamp according to claim 1, wherein
the trigger has a inner ring defining a receiving section to make contact with a guide cup.

8. A clamp according to claim 1, wherein
the at least two gripping fingers have an inner surface with a boss disposed thereon to engage each notch.

9. A clamp according to claim 1, wherein
one of an inner surface of the outer locking portion or an outer surface of the at least two gripping fingers has at least one recess.

10. A clamp according to claim 9, wherein
the other of the inner surface of the outer locking portion or the outer surface of the at least two gripping fingers has a protrusion for insertion into the at least one recess.

11. A clamp, comprising:
a housing with a first end, a second end, and an interior cavity;

at least two jaws disposed within the cavity, each having a notch;

a biasing member within the cavity biasing the at least two jaws towards the first end;

a retainer within the cavity including at least two gripping fingers with an inner surface having a boss engaging the notches; and a trigger within the cavity having a outer locking portion engaging an outer surface of the at least two gripping fingers, the trigger also having an inner ring defining a receiving section.

12. A clamp according to claim 11, further comprises
a guide cup configured to move within the cavity to contact the receiving section.

13. A clamp according to claim 12, further comprises
a funnel guide is disposed on the second end.

14. A clamp according to claim 11, wherein
the interior cavity has a surface that tapers from the first end to the second end of the housing.

15. A clamp according to claim 11, wherein
the retainer has a substantially annular biasing member nesting section to receive an end of the biasing member.

16. A clamp according to claim 11, wherein
the at least two gripping fingers include biasing member supports.

17. A clamp according to claim 11, wherein
the at least two gripping fingers include four gripping fingers each having a biasing member support.

18. A clamp according to claim 11, wherein
one of an inner surface of the outer locking portion or the outer surface of the at least two gripping fingers has at least one recess.

19. A clamp according to claim 18, wherein the other of the inner surface of the outer locking portion or the outer surface of the at least two gripping fingers has at least one protrusion for insertion into the at least one recess.

20. A device for splicing cables, comprising:
a body with opposing ends and a clamp located at each end, each of the clamps, includes:

a housing with a first end, a second end, and an interior cavity;

at least two jaws disposed within the cavity, each having a notch;

a biasing member within the cavity biasing the at least two jaws towards the first end;

a retainer within the cavity including at least two gripping fingers each with an inner surface having a boss configured to engage the notches;

a trigger within the cavity having a outer locking portion engaging an outer surface of each gripping finger, the trigger also having a receiving section; and a guide cup within the cavity movable to contact the receiving section.

* * * * *